(12) United States Patent
Oda

(10) Patent No.: US 10,250,434 B2
(45) Date of Patent: Apr. 2, 2019

(54) ELECTRONIC CONTROL APPARATUS

(71) Applicant: DENSO CORPORATION, Kariya, Aichi-pref. (JP)

(72) Inventor: Shinichiro Oda, Kariya (JP)

(73) Assignee: DENSO CORPORATION, Kariya (JP)

( * ) Notice: Subject to any disclaimer, the term of this patent is extended or adjusted under 35 U.S.C. 154(b) by 302 days.

(21) Appl. No.: 15/360,201

(22) Filed: Nov. 23, 2016

(65) Prior Publication Data

US 2017/0187567 A1 Jun. 29, 2017

(30) Foreign Application Priority Data

Dec. 25, 2015 (JP) ................. 2015-253462

(51) Int. Cl.
*H04L 12/24* (2006.01)
*H04L 29/08* (2006.01)
*G07C 5/08* (2006.01)
*G06F 12/14* (2006.01)

(52) U.S. Cl.
CPC ...... *H04L 41/0654* (2013.01); *G06F 12/1441* (2013.01); *G07C 5/0808* (2013.01); *H04L 67/06* (2013.01); *H04L 67/12* (2013.01); *H04L 67/34* (2013.01); *G07C 2205/02* (2013.01)

(58) Field of Classification Search
CPC ..................................... H04L 12/50

USPC .......................................... 370/329
See application file for complete search history.

(56) References Cited

U.S. PATENT DOCUMENTS

2003/0229900 A1* 12/2003 Reisman ........... G06F 17/30873
725/87
2015/0254909 A1 9/2015 Harata et al.

* cited by examiner

*Primary Examiner* — Dang T Ton
(74) *Attorney, Agent, or Firm* — Posz Law Group, PLC

(57) ABSTRACT

An electronic control apparatus is communicable with an external device through a communication line and receives a communication request. The electronic control apparatus includes: control portions; resources that individually correspond to each of the control portions; linking information that links the resources individually corresponding to each of the control portions with respect to the control portions without individually overlapping; a communication propriety determination portion that determines a communication propriety with the external device; and a communication portion that responds to the communication request and communicates with the external device. The communication propriety determination portion determines that the communication is permitted when the resource information indicates the resource linked with the corresponding control portion; and determines that the communication is not permitted when the resource information does not indicate the resource linked with the corresponding control portion.

9 Claims, 7 Drawing Sheets

FIG. 4
| ID | | DATA FIELD | |
FIG. 5
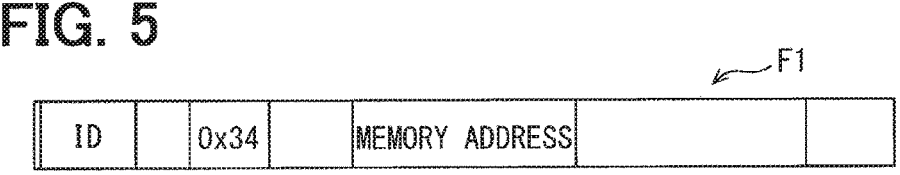
| ID | | 0x34 | MEMORY ADDRESS | | |
FIG. 6
| ID | | 0x36 | TRANSFER DATA | |
FIG. 7
| ID | | 0x37 | | |

ELECTRONIC CONTROL APPARATUS

CROSS REFERENCE TO RELATED APPLICATION

This application is based on Japanese Patent Application No. 2015-253462 filed on Dec. 25, 2015, the disclosure of which is incorporated herein by reference.

TECHNICAL FIELD

The present disclosure relates to an electronic control apparatus enabling to communicate with an external device.

BACKGROUND

Patent Literature 1: JP 2014-78801 A (corresponding to US 2015/0254909 A1)

Patent literature 1, for example, discloses a technique that prevents a depletion of identification information. Patent literature 1 relates to a repeating device. The repeating device relays transmission and reception of a diagnosis frame between an electronic control apparatus connected to two or more LANs and a first tool performing a fault diagnosis of these electronic control apparatus. Any one of the LANs is connected with a second tool performing wireless communication with a center. The repeating device relays transmission and reception of the diagnosis frame between the second tool performing the fault diagnosis according to an instruction from the center and each of the electronic control apparatus. The repeating device converts identification information of the diagnosis frame into identification information used in the fault diagnosis by the first tool when relaying between the second tool and the electronic control apparatus.

SUMMARY

The number of control portions mounted to an electronic control apparatus increases recently. The electronic control apparatus may require identification information indicating each of the control portions when the electronic control apparatus communicates with an external different device. In such a case, it may be impossible to prevent a depletion of the identification information indicating each of the control portions according to the technique disclosed in Patent literature 1.

It is an object of the present disclosure to provide an electronic control apparatus enabling to prevent a depletion of identification information in a case where the number of the control portions increases.

According to one aspect of the present disclosure, an electronic control apparatus is communicable with at least one external device through a communication line and receives from the at least one external device at least, a communication request including identification information indicating a reception destination and resource information indicating a resource. The electronic control apparatus comprises: multiple control portions; multiple resources that individually correspond to each of the control portions, each of the control portions recognizing the communication request including common identification information as the communication request to a corresponding control portion of the control portions; linking information that links the resources individually corresponding to each of the control portions with respect to the control portions without individually overlapping; a communication propriety determination portion that determines a communication propriety with the at least one external device corresponding to the communication request, based on the resource information included in the communication request and the linking information in receiving the communication request; and a communication portion that responds to the communication request and communicates with the at least one external device when the communication propriety determination portion determines that communication is permitted. The communication propriety determination portion determines that the communication with the at least one external device is permitted when the resource information included in the communication request indicates the resource linked with the corresponding control portion. The communication propriety determination portion determines that the communication with the at least one external device is not permitted when the resource information included in the communication request does not indicate the resource linked with the corresponding control portion.

According to the present disclosure, each of the control portions determines to be communicable with an external device when resource information included in a communication request indicates a resource linked with the corresponding control portion. Each of the control portions determines not to be communicable with the external device when the resource information does not indicate the resource linked with the corresponding control portion. Each of the control portions communicates with the external device in response to the communication request from the external device when it is determined to be communicable. Therefore, according to the present disclosure, it may be possible to prevent communication frames from collide each other by concurrently performing communication by multiple control portions.

Furthermore, according to the present disclosure, multiple control portions are provided, and each of the control portions recognizes that common identification information is a communication request intended for the corresponding control portion. Thus, it may be possible to prevent the number of identification information from increasing even when the number of the control portions increase.

Thus, according to the present disclosure, it may be possible to prevent frames from colliding as a result of concurrent communication by multiple control portions, while preventing a depletion of identification information.

BRIEF DESCRIPTION OF THE DRAWINGS

The above and other objects, features and advantages of the present disclosure will become more apparent from the following detailed description made with reference to the accompanying drawings. In the drawings:

FIG. 4 is a diagram illustrating a schematic configuration of a communication frame in the first embodiment;

FIG. 5 is a diagram illustrating a schematic configuration of a download request frame in the first embodiment;

FIG. 6 is a diagram illustrating a schematic configuration of a data transfer frame in the first embodiment;

FIG. 7 is a diagram illustrating a schematic configuration of a transfer end request frame in the first embodiment;

DETAILED DESCRIPTION

Figure 1:
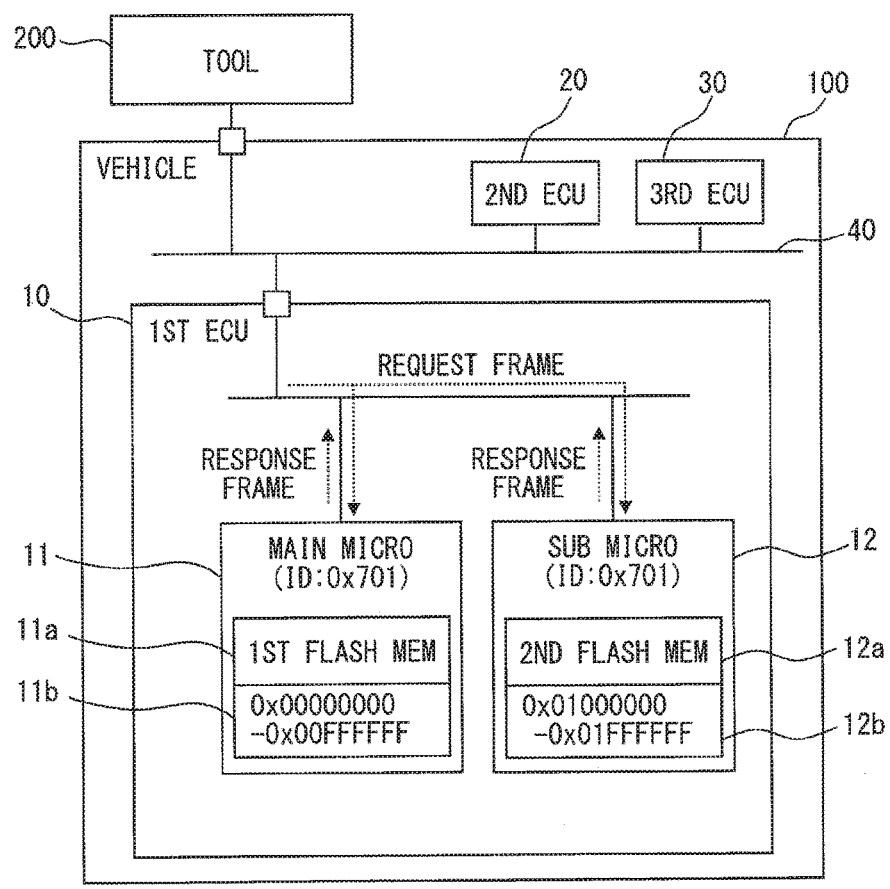
FIG. 1 is a block diagram illustrating a schematic configuration of a first ECU in a first embodiment.

Hereinafter, embodiments of the present disclosure will be explained with referring to the drawings. Incidentally, in each embodiment, a part corresponding to a part explained in the precedent embodiment may have identical symbol or identical numeral, and an explanation of the part will be omitted. In each embodiment, when a configuration is partially explained, a mode explained in the precedent embodiment may be applied to the other part of the configuration by referring the precedent embodiment.

First Embodiment

In the present embodiment, the present disclosure is applied to a first ECU 10, as an example. In the present embodiment, as an example, the first ECU 10 is mounted on a vehicle 100. ECU is the abbreviation for Electronic Control Unit. The configuration of the first ECU 10 and an electronic control system with which the first ECU 10 is provided will be explained with referring to FIG. 1 or the like.

The first ECU 10 can be mounted on the vehicle 100 with a second ECU 20, a third ECU 30 and a communication line 40. The first ECU 10 can communicate with the second ECU 20 and the third ECU 30 through the communication line 40, and configures a vehicle onboard network (also being referred to as an in-vehicle network).

The first ECU 10 can communicate with a fault diagnosis tool 200 provided in the exterior of the vehicle 100 through the communication line 40. That is, the first ECU 10 configures an electronic control system with the fault diagnosis tool 200. Incidentally the fault diagnosis tool 200 corresponds to an example of an external device. The fault diagnosis tool 200 may also be referred to as a diagnosis tool, for simplicity.

The second ECU 20 and the third ECU 30 may communicate with the diagnosis tool 200 through the communication line 40. In this case, the electronic control system is considered to include the second ECU 20 and the third ECU 30 in addition to the first ECU 10 and the diagnosis tool 200. The present disclosure may be realized without the second ECU 20 and the third ECU 30.

The first ECU 10 connected to the communication line 40 and the diagnosis tool 200 or the like perform communication based on specification, such as CAN (registered trademark), LIN, MOST, Ethernet (registered trademark), and FlexRay. Therefore, any pair of the ECUs 10, 20, 30 and the diagnosis tool 200 and any one of the ECUs 10, 20, 30 perform the communication based on the specification through the communication line 40. Each of the ECUs 10, 20, 30 and the diagnosis tool 200 use a communication frame at the time of communication through the communication line 40. The communication frame can be classified into a request frame including various request information (a communication request) and a response frame including various response information. The communication frame includes a request frame and a response frame.

Hereinafter, an example of the communication frame will be explained using FIG. 4 to FIG. 7. The communication frame includes identification information and a data field, as illustrated in FIG. 4. The identification information (ID) is information for identifying the reception destination of the communication frame (in other words, a transmission target), and may also be referred to as ID. The ID may be information for identifying a sending source, in addition to the reception destination of the communication frame.

FIG. 5 illustrates a download request frame F1. The download request frame F1 is an example of the request frame. The download request frame F1 request to download data. More specifically, the download request frame F1 includes an ID, information (0x34) indicating to be the download request frame, and a memory address indicating a head position of the data transfer destination. The download request frame F1 includes a communication frame for requiring download of an update data at the time of reprograming, for example. Therefore, the address indicates the head position of the destination (transfer destination) of the update data. Thus, the address of the download request frame F1 corresponds to resource information indicating a resource. Hereinafter, the download request frame F1 may also be referred to as a DL frame F1.

FIG. 6 indicates a data transfer frame F2. The data transfer frame F2 is an example of the request frame. The data transfer frame F2 is a data transfer request that requests to transfer data. The data transfer frame F2 includes an ID, the information (0x36) indicating to be the data transfer frame, transfer data, or the like. The data transfer frame F2 is, for example, a communication frame for transferring (transmitting) an update data at the time of reprograming. In this case, the transfer data includes the update data. Hereinafter, the data transfer frame F2 may also be referred to as a transfer frame F2.

FIG. 7 illustrates a transfer end request frame F3. The transfer end request frame F3 is an example of the request frame. The transfer end request frame F3 is a transfer end request that requests an end of data transfer. The transfer end request frame F3 includes an ID, information (0x37) indicating to be a transfer end request frame, or the like. The transfer end request frame F3 is, for example, a communication frame for requesting that transfer of the update data has completed. Hereinafter, the transfer end request frame F3 may also be referred to as an end frame F3.

The configuration of the first ECU 10 and the electronic control system with which the first ECU 10 is provided will be explained. The first ECU 10 includes a main microcomputer 11 and a sub microcomputer 12. The main microcomputer 11 and the sub microcomputer 12 correspond to multiple control portions (also referred to as controllers). The first ECU 10 may include a RAM or the like. Incidentally the first ECU 10 includes two or more microcomputers, and may include three or more microcomputers.

The main microcomputer 11 has an operation portion, a first flash memory 11a as a resource, and first linking information 11b. The main microcomputer 11 recognizes that a communication frame is intended for the corresponding microcomputer (that is, the main microcomputer), when the ID included in the communication frame is 0x701. The main microcomputer 11 recognizes that a communication frame is a request frame intended for the microcomputer, when receiving a request frame including the ID of 0x701 as a communication frame.

Each of the main microcomputer 11 and the sub microcomputer 12 recognize a communication frame including a common ID as a communication frame intended for the corresponding microcomputer. In other words, a certain ID (0x701 in the present embodiment) is used for the main microcomputer 11 and the sub microcomputer 12 commonly. Thus, the main microcomputer 11 recognizes the request frame having ID of 0x701 as a communication request intended for the main microcomputer 11, and also the sub microcomputer 12 recognizes the request frame having the ID of 0x701 as a communication request intended for the sub microcomputer 12.

In the present embodiment, the ID indicating priority in the communication through the communication line 40 is adopted. Thus, the ID indicates a priority order of the communication frame. For example, there are an ID intended for a microcomputer in the second ECU 20, and there may be another ID intended for a microcomputer in the third ECU 30. In the electronic control system, a microcomputer which has transmitted a communication frame having a high priority can communicate through the communication line 40, when two microcomputers try to communicate through the communication line 40 at the same time. That, the ID is considered to be information for classifying a transfer target and corresponds to information for determining a priority of communication arbitration.

In the present embodiment, the ID which is the diagnosis identification information assigned for fault diagnosis is adopted. In other words, the ID common to the main microcomputer 11 and the sub microcomputer 12 is the diagnosis identification information that has been assigned for the fault diagnosis. That is, the ID is considered to be the information for classifying the transfer target, the information for determining a priority order of a communication arbitration, and information indicating purposes and types of a communication frame. Since the number of the ID which is the diagnosis identification information is limited, the ID may be depleted (or exhausted), when a microcomputer to be a target of the ID increases. For example, in the communications protocol of ISO, using 0x700-0x7FF is decided as diagnosis identification information.

The operation portion performs transmission of the response frame while performing various operational processing based on a program stored in the first flash memory 11a and request information received by the request frame. The operation portion has functions to perform the transmission of a communication frame including various control signals, self-diagnosis processing of the vehicle 100, or the like.

The operation portion has a function to reprogram a program stored in the first flash memory 11a. Thus, the first ECU 10 receives a communication frame including the update data from a diagnosis tool 200 so as to realize a reprogramming, which is one of the functions of the operation portion. The first ECU 10 downloads the update data from the diagnosis tool 200. The first ECU 10 realizes the reprogramming by responding to each of the multiple associating communication requests and communicating the diagnosis tool 200. Incidentally, each of the multiple communication requests is associated (or is linked) with each other.

The first flash memory 11a includes multiple storage areas. The multiple storage areas are managed by addresses, respectively. Thus, each of the multiple addresses is considered to indicate each of the multiple storage areas.

The first flash memory 11a is considered to be a resource separately corresponding to the main microcomputer 11 since the first flash memory 11a is provided into the main microcomputer 11. The main microcomputer 11 is considered to include multiple storage areas in the first flash memory 11a as a resource. The first flash memory 11a is considered to be provided dedicated to the main microcomputer 11, or to exist under the main microcomputer 11. The operation portion of the main microcomputer 11 can access the multiple storage areas of the first flash memory 11a, but the operation portion of the sub microcomputer 12 cannot access the multiple storage areas of the first flash memory 11a. An address for managing the multiple storage areas of the first flash memory 11a is considered to be specific information of the main microcomputer 11.

The first linking information 11b includes information by which the first flash memory 11a corresponding to the main microcomputer 11 is linked with the main microcomputer 11 without individually overlapping. In other words, in the first linking information 11b, an address indicating each storage area of the first flash memory 11a corresponding to the main microcomputer 11 is linked with the main microcomputer 11 without individually overlapping. That is, the first linking information 11b does not overlap with the second linking information 12b of the sub microcomputer 12. The first linking information 11b is considered to be information that links (or associates or coordinates) the main microcomputer 11 and the first flash memory 11a.

An address of the first flash memory 11a is specific information of the main microcomputer 11. In the present embodiment, the address of the first flash memory 11a is used as the first linking information 11b. In the present embodiment, as an example, 0x00000000 to 0x00FFFFFF are adopted as the first linking information 11b. The main microcomputer 11 includes multiple information as the first linking information 11b such as 0x00000000 to 0x00FFFFFF. Each of 0x00000000 to 0x00FFFFFF may be referred to as information indicating the first flash memory 11a. The first flash memory 11a is a resource of the main microcomputer 11. Therefore, when a communication frame received from the diagnosis tool 200 or the like includes any one of 0x00000000 to 0x00FFFFFF, the main microcomputer 11 recognizes that the communication frame is a communication frame transmitted for the microcomputer.

The sub microcomputer 12 has an operation portion, a second flash memory 12a as a resource, and second linking information 12b. The sub microcomputer 12 includes configurations similar to the main microcomputer 11 though the name of each configuration may be different. Thus, the detailed explanation will be omitted.

The second flash memory 12a is a resource individually corresponding to the sub microcomputer 12. The sub microcomputer 12 is considered to include multiple storage areas in the second flash memory 12a as a resource. The first ECU 10 is considered to include the first flash memory 11a and the second flash memory 12a, as multiple resources, respectively corresponding to the main microcomputer 11 and the sub microcomputer 12 individually.

The second linking information 12b includes information indicating that the second flash memory 12a corresponding to the sub microcomputer 12 is linked with the sub microcomputer 12 without individually overlapping. The second linking information 12b is considered to be information that links (or associates or coordinates) the sub microcomputer 12 and the second flash memory 12a. In the present embodiment, as an example, 0x01000000 to 0x01FFFFFF are adopted as the second linking information 12b. When a communication frame received from the diagnosis tool 200 or the like includes any one of 0x01000000 to 0x01FFFFFF, the sub microcomputer 12 recognizes that the communication frame is a communication frame which has been transmitted for the sub microcomputer 12. Each of 0x01000000 to 0x01FFFFFF corresponds to the second linking information 12b. Each of 0x01000000 to 0x01FFFFFF does not overlap any one of 0x00000000 to 0x00FFFFFF, which are the first linking information 11b.

Incidentally, configurations of the second ECU 20 and the third ECU 30 are similar to the configuration of the first ECU 10. The explanation of the configurations of the second ECU 20 and the third ECU 30 will be omitted. It should be noticed that the second ECU 20 may include only one microcomputer. Similarly, the third ECU 30 may include only one microcomputer.

Hereinafter, the diagnosis tool 200 will be explained. The diagnosis tool 200 is a device used in a dealer (for example, a car dealer), a repair shop, or the like. The diagnosis tool 200 can be connected to the communication line 40 through a connector or the like. The diagnosis tool 200 can communicate with the first ECU 10 or the like in connection to the communication line 40. Incidentally, the diagnosis tool 200 is configured to be detachable to the communication line 40.

The diagnosis tool 200 communicates with the first ECU 10 or the like, so that the diagnosis tool 200 performs a fault diagnosis of equipment mounted on the vehicle 100 based on data transmitted from the first ECU 10 or the like and transmits the update data at the time of reprogramming of the first ECU 10. In detail, the diagnosis tool 200 transmits to the first ECU 10, the DL frame F1, the transfer frame F2, and the end frame F3. Thus, the first ECU 10 received the DL frame F1 at least including the ID and the address from the diagnosis tool 200.

Incidentally, these communication frames F1 to F3 can be considered as multiple associating communication requests. The DL frame F1 is the initial communication request in the multiple associating communication requests. The transfer frame F2 is the second communication request in the multiple associating communication requests. The end frame F3 is the last communication request in the multiple associating communication requests.

The processing operation of the electronic control apparatus will be explained with reference to FIG. 2, FIG. 3 and FIG. 8.

Figure 2:
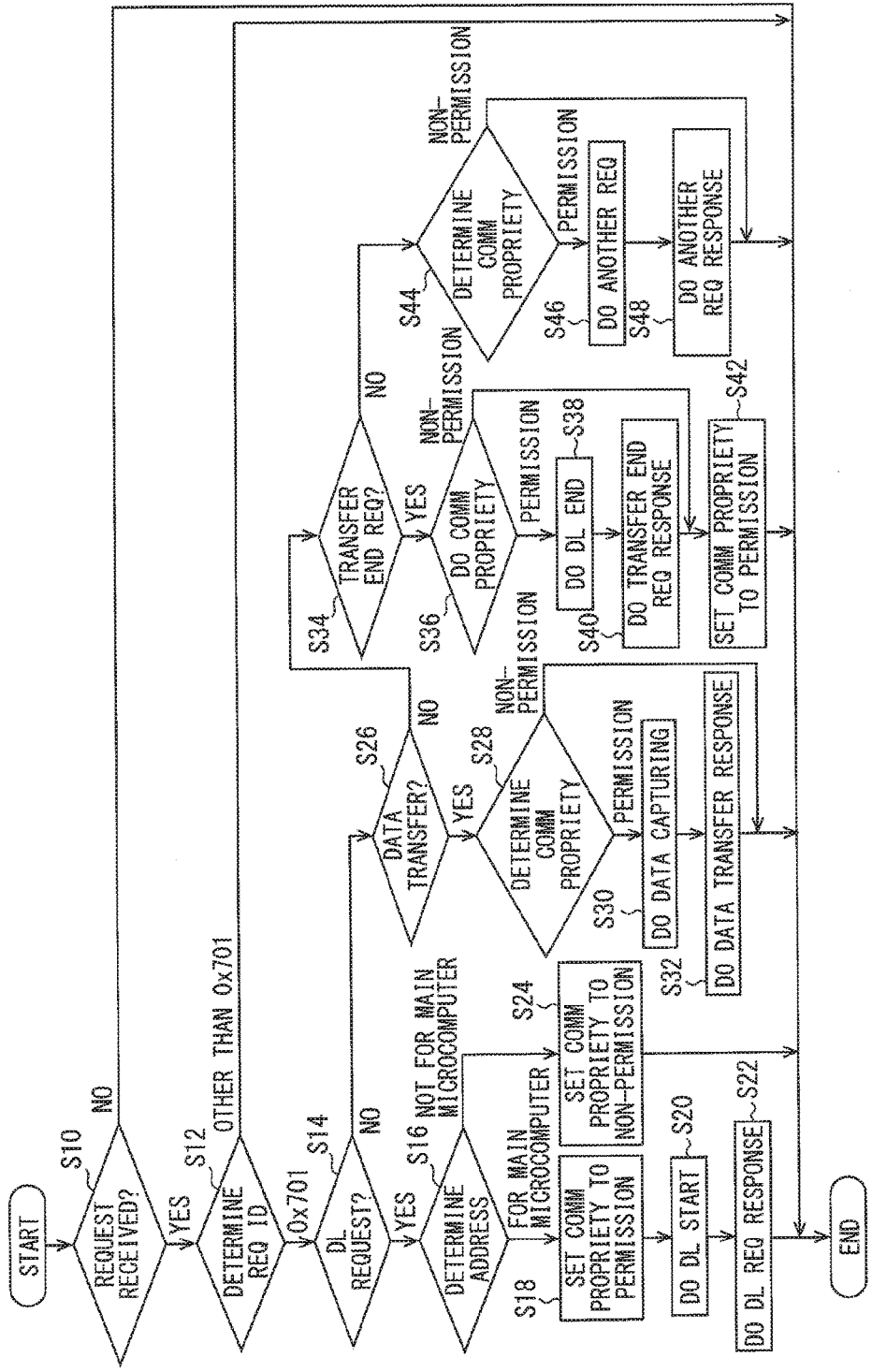
FIG. 2 is a flowchart illustrating a processing operation of a main microcomputer in the first embodiment.
Figure 3:
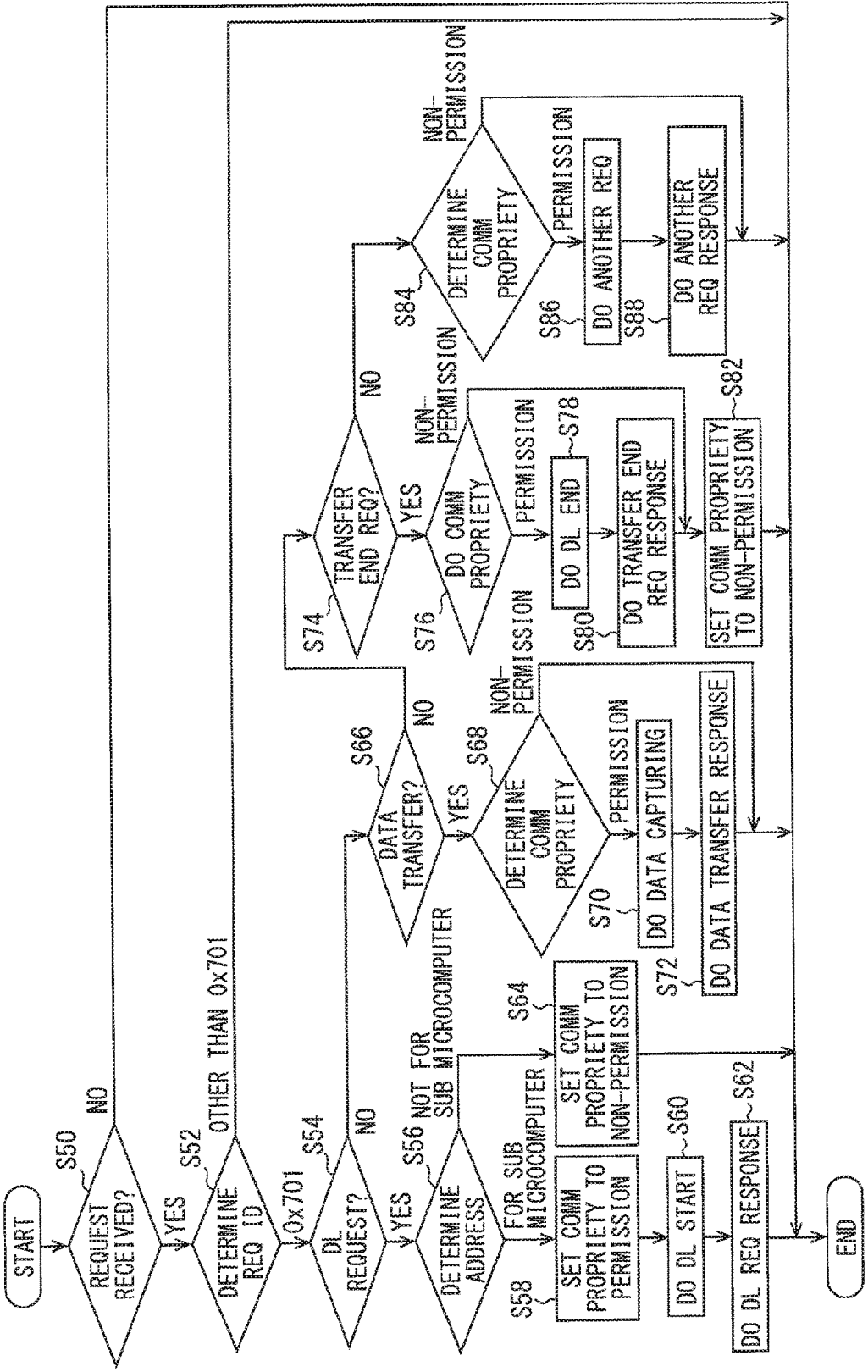
FIG. 3 is a flowchart illustrating a processing operation of a sub microcomputer in the first embodiment.
Figure 8:
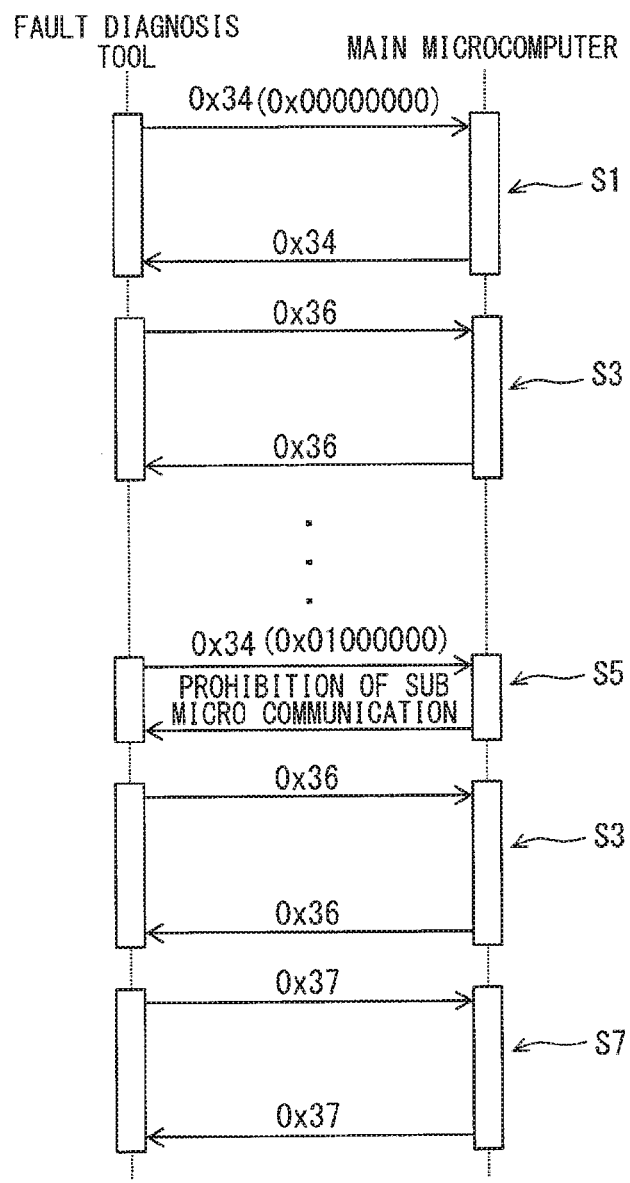
FIG. 8 is a sequence diagram illustrating a communication between a tool and the main microcomputer in the first embodiment.

The processing operation of the main microcomputer 11 is explained using FIG. 2 and FIG. 8. The main microcomputer 11 performs a flowchart of FIG. 2 periodically, for example, each 100 milliseconds (ms). Here, it is supposed that the update data is downloaded from the diagnosis tool 200, as an example. The initial value (the initial setting) of the communication propriety of the main microcomputer 11 is set to permission. The flowchart of FIG. 2 is processing mainly executed by the operation portion of the main microcomputer 11. Incidentally, the communication propriety may be referred to as a communication permission and non-permission. In other words, the communication propriety includes two states such as a communication permission state, a communication non-permission state.

At step S10, it is determined whether the main microcomputer 11 has received the request frame or not. The main microcomputer 11 determines that there is a request reception (that is, the request frame is received), in a case where a new request frame is inputted from the external device after execution of the most recent step S10. The processing shifts to step S12 when the main microcomputer 11 determines that the request frame is received. The processing of FIG. 2 ends when the main microcomputer 11 does not determine that the request frame is received.

At step S12, the request ID is determined. The main microcomputer 11 determines whether the ID included in the request frame is the ID intended for the microcomputer. In other words, the main microcomputer 11 checks the ID included in the request frame, and determine whether the request frame has transmitted to the main microcomputer 11. The main microcomputer 11 considers the request frame is transmitted to the main microcomputer 11 and the processing shifts to step S14, when it is determined that the ID includes 0x701. The main microcomputer 11 considers that the request frame is not transmitted to the main microcomputer 11 and the processing of FIG. 2 ends, when the main microcomputer 11 determines that the ID does not include 0x701.

At step S14, it is determined whether the download request is received or not. The main microcomputer 11 considers that there is the download request when it is determined that the DL frame F1 is received, and the processing shifts to step S16. The main microcomputer 11 considers the download request is not received, when the DL frame F1 is not received, and the processing shifts to step S26. Incidentally, the phrase "download" may be referred to as "DL" for simplicity.

At step S16, the address is determined (the step S16 corresponding to a communication propriety determination portion). The main microcomputer 11 determines whether a memory address included in the DL frame F1 corresponds to an address illustrating a resource linked to the main microcomputer 11, based on a memory address and the first linking information 11b included in the DL frame F1. In other words, it is determined whether the DL frame F1 is a frame to the main microcomputer 11. The communication propriety determination portion may be referred to as a communication permission/non-permission determination portion.

The main microcomputer 11 determines that the DL frame F1 is a frame intended for the microcomputer, when it is determined that the memory address included in the DL frame F1 includes any one of 0x00000000 to 0x00FFFFFF. Each of 0x00000000 to 0x00FFFFFF is the first linking information 11b. In this case, the processing shifts to step S18. The main microcomputer 11 determines that the DL frame F1 is not a frame to the microcomputer, when it is determined that the memory address included in the DL frame F1 does not include 0x00000000 to 0x00FFFFFF. In this case, the processing shifts to step S24. In other words, the main microcomputer 11 once recognizes that the request frame is the frame intended for the microcomputer at step S12, and then, at step S16, the main microcomputer 11 determines that the request frame is not the frame intended for the microcomputer.

At step S18, the communication propriety of the main microcomputer 11 is set to the permission (the step S18 corresponding to a communication propriety determination portion). The main microcomputer 11 permits the communication through the communication line 40, since the DL frame F1 is the request frame intended for the microcomputer (the main microcomputer 11 in this case). Accordingly, the main microcomputer 11 can communicate with the diagnosis tool 200 in response to the DL frame F1.

It is supposed that the ID includes 0x701 and the DL frame F1 includes any one of a memory address of 0x00000000 to 0x00FFFFFF. In this case, the sub microcomputer 12 considers the DL frame F1 as a frame transmitted for the microcomputer (the sub microcomputer 12 in this case). However, the memory address of the DL frame F1 does not include any one of 0x01000000 to 0x01FFFFFF, which is the second linking information 12b. Thus, the sub microcomputer 12 determines that the DL frame F1 is not a frame for the microcomputer.

Incidentally, the main microcomputer 11 stores a determination result of the communication propriety, that is, whether the communication propriety shows the permission or the non-permission (also referred to as a prohibition). Therefore, the main microcomputer 11 stores that the communication propriety corresponds to the permission, when it is determined to be the permission at step S18. Incidentally, the main microcomputer 11 stores the determination result of the communication propriety into a result store potion such as a register, RAM.

The main microcomputer 11 keeps the determination result based on the initial communication request in the multiple associating communication requests until communication with the diagnosis tool 200 ends in response to the multiple associating communication requests (a communication propriety determination portion). That is, the main microcomputer 11 maintains the determination result based on the DL frame F1, which is the initial communication request, until communication with the diagnosis tool 200 ends in response to the transfer frame F2 and the end frame F3, in a case where it is determined to be the permission based on the DL frame F1. In other words, the main microcomputer 11 maintains the communication propriety to be the permission until the communication with the diagnosis tool 200 ends in response to the transfer frame F2 and the end frame F3, when it is determined to be the permission based on the DL frame F1. Hereinafter, a period or status after it is determined as the permission based on the DL frame F1 and before the communication with the diagnosis tool 200 ends in response to the transfer frame F2 and the end frame F3 may be referred to as a download process continuing period or a download process continuing status.

Accordingly, even when neither the transfer frame F2 nor the end frame F3, which are second and subsequent time of the communication request, includes the memory address, it is possible to prevent a collision of the communication frame by the microcomputer being the non-permission of the communication.

This explanation adopts the DL frame Ft the transfer frame F2, and the end frame F3 as the multiple associating communication request. However, the application of the present disclosure is not limited the present embodiment. The present disclosure can be adopt when a determined result based on the initial communication request in multiple associating communication requests is maintained until all the communication with an external device such as the diagnosis tool 200 in response to all multiple associating communication terminals end (corresponding to the communication propriety determination portion)

Only the main microcomputer 11 of the first ECU 10 deals with a request from the external device such as the diagnosis tool 200 when the main microcomputer 11 maintains (continues) the determination result. The first ECU 10 maintains the determination result regarding the sub microcomputer 12 in some cases, as described later. Thus, a microcomputer of the main microcomputer 11 and the sub microcomputer 12 of the first ECU 10, the microcomputer maintaining the determination result, processes the request from the external device such as the diagnosis tool 200. In other words, the microcomputer maintaining the determination result of the main microcomputer 11 and the sub microcomputer 12 may correspond to a microcomputer including a communication propriety determination portion maintaining the determination result. In the first ECU 10, only one microcomputer having a memory indicated by the memory address under exclusively process and respond to a request from the diagnosis tool 200 in a case where the first ECU 10 is in the download process continuing period with the diagnosis tool 200.

For example, as illustrated in a sequence diagram of FIG. 8, the first ECU 10 may receive the communication request for the sub microcomputer 12 (S5) when the main microcomputer 11 is in the download process continuing period. That is, the main microcomputer 11 may receive a request frame including 0x01000000 as a memory address in the download process continuing period. In this case, the first ECU 10 can be configured so that the sub microcomputer 12 does not respond to this communication request. The main microcomputer 11 transmits a response frame indicating that the sub microcomputer 12 is in the non-permission. Therefore, it is possible to prevent communication frame having the identical ID from collide at the communication line 40 until the communication with the external device such as the diagnosis tool 200 in response to all multiple associating communication requests ends.

Incidentally, the present disclosure may not continue the determination result. In other words, the main microcomputer 11 and the sub microcomputer 12 may set the communication propriety to the permission when the memory address in the request frame indicates a resource linked with the microcomputer.

A DL start processing is performed at step S20. The main microcomputer 11 performs a processing corresponding to the request by the DL frame F1 which is a request frame. In other words, the main microcomputer 11 reads a memory address included in the DL frame F1, and recognizes a position within the first flash memory 11a that should store a transfer data to be received, the data transfer frame F2 including the transfer data.

At step S22, a DL request response processing is performed (step S22 corresponding to a communication portion). The main microcomputer 11 performs communication with the diagnosis tool 200 through the communication line 40 in response to the DL frame F1. In this case, the main microcomputer 11 transmits the response frame to the diagnosis tool 200.

The main microcomputer 11 performs a processing in accordance with a request by the DL frame F1, and performs a response to the DL frame F1, as illustrated in S1 of FIG. 8. The main microcomputer 11 determines the processing and the response based on a state of the communication propriety. The DL frame F1 is the request frame.

At step S24, the communication propriety of the main microcomputer 11 is set to the non-permission (step S24 corresponding to a communication propriety determination portion). The main microcomputer 11 prohibits the communication through the communication line 40 since the DL frame F1 is not the request frame intended for the microcomputer. Accordingly, the main microcomputer 11 cannot communicate with the diagnosis tool 200, the second ECU 20, or the like.

Therefore, the main microcomputer 11 determines whether there is a download for the main microcomputer 11 based on the memory address included in the DL frame F1 (step S16). When the memory address shows the DL frame F1 is a download request for the microcomputer, the main microcomputer 11 sets the communication propriety to the permission (that is, permits the communication) (step S18). In other cases, the main microcomputer 11 sets the communication propriety to the non-permission.

At step S26, it is determined whether the data transfer request is received or not. The main microcomputer 11 considers that there is the data transfer request, when it is determined that the transfer frame F2 is received, and the processing shifts to step S28. The main microcomputer 11 considers that there is no data transfer request, when the transfer frame F2 is not received, and the processing shifts to step S34.

At step S28, the communication propriety of the main microcomputer 11 is determined. The main microcomputer 11 determines the communication propriety based on the stored content stored in the result store portion. The processing shifts to step S30 when the main microcomputer 11 has determined that the determination result stored in the result store portion indicates the permission. The processing of FIG. 2 ends when it is determined that the determination result indicates the non-permission.

A data capturing processing is performed at step S30. The main microcomputer 11 performs a processing corresponding to the request by the transfer frame F2. The transfer frame F2 is the request frame. That is, the main microcomputer 11 captures the transfer data included in the transfer frame F2. Incidentally, the main microcomputer 11 stores the captured transfer data into the first flash memory 11a, so as to reprogram a program.

The diagnosis tool 200 may divide the update data into multiple transfer data, depending on the size (volume) of the update data. In this case, the diagnosis tool 200 transmits the transfer frame F2 several times. That is, the main microcomputer 11 may repeat the step S30 several times.

A response processing for the data transfer is performed at step S32. The main microcomputer 11 responds to the transfer frame F2, so as to communicate with the diagnosis tool 200 through the communication line 40. In this case, the main microcomputer 11 transmits the response frame to the diagnosis tool 200.

The main microcomputer 11 performs a processing in accordance with a request by the transfer frame F2, and performs a response to the transfer frame F2, as illustrated in S3 of FIG. 8. The main microcomputer 11 repeatedly performs S3 when the update data is divided into multiple transfer data. The main microcomputer 11 determines the above processing and the above response based on a state of the communication propriety.

At step S34, it is determined whether the transfer end request is received or not. The main microcomputer 11 considers that the transfer end request is received when receiving the end frame F3, and the processing shifts to step S36. The main microcomputer 11 considers that the transfer end request is not received unless receiving the end frame F3, and the processing shifts to step S44.

At step S36, the communication propriety of the main microcomputer 11 is determined. The main microcomputer 11 determines and operates at step S36 similar to step S28. The processing shifts to step S38 when the main microcomputer 11 determines that the determination result stored in the result store portion indicates the permission. The processing shifts to step S42, when it is determined that the determination result indicates the non-permission.

A DL end processing is performed at step S38. The main microcomputer 11 performs a processing in response to a request by the end frame F3. The end frame F3 is the request frame. That is, the main microcomputer 11 determines whether multiple communication requests, which are started from the DL frame F1, end normally. For example, the main microcomputer 11 determines that the multiple communication requests end normally, when the total amount of the transfer data stored from the data transfer frame F2 matches the amount of data to be planned.

At step S40, a response processing for the transfer end request is performed. The main microcomputer 11 responds to the end frame F3, so as to communicate with the diagnosis tool 200 through the communication line 40. In this case, the main microcomputer 11 transmits the response frame to the diagnosis tool 200.

The main microcomputer 11 performs a processing in response to a request by the end frame F3, and performs a response to the end frame F3, as illustrated in S7 of FIG. 8. The main microcomputer 11 determines the processing and the response based on a state of the communication propriety. As illustrated in step S20, step 2, step S30, and step S32, the main microcomputer 11 determines a processing in accordance with the request by the request frame and a response to the request frame, based on the state of the communication propriety.

At step S42, the communication propriety of the main microcomputer 11 is set to the permission. The main microcomputer 11 continues this permission since the main microcomputer has already set the communication propriety to the permission at the time of step S40. As described above, the main microcomputer 11 continues the determination result based on the DL frame F1, which is the initial communication request, until communication with the diagnosis tool 200 ends in response to the end frame F3. Thus, the main microcomputer 11 does not continue the determination result at the time of step S42. The main microcomputer 11 sets the communication propriety to the permission at step S42. This is because a predetermined one of the main microcomputer 11 and the sub microcomputer 12 deals with a request from the diagnosis tool 200, the second ECU 20, the third ECU 30, or the like when none of the main microcomputer 11 and the sub microcomputer 12 continue the determination result. That is, the predetermined one of the main microcomputer 11 and the sub microcomputer 12 corresponds to the main microcomputer 11.

At step S44, the communication propriety of the main microcomputer 11 is determined. The main microcomputer 11 determines and operates at step S44 similar to step S28. The processing shifts to step S46 when the main microcomputer 11 determines that the determination result stored in the result store portion indicates the permission. The processing of FIG. 2 ends when it is determined that the determination result indicates the non-permission.

Another request processing is performed at step S46. The main microcomputer 11 performs a processing in accordance with a request frame other than the DL frame F1, the transfer frame F2, and the end frame F3.

At step S48, a response processing for the other request processing is performed. The main microcomputer 11 responds to the request frame other than the DL frame F1, the transfer frame F2, and the end frame F3, and performs a communication with the diagnosis tool 200 through the communication line 40. In this case, the main microcomputer 11 transmits the response frame to the diagnosis tool 200.

Next, the processing operation of the sub microcomputer 12 will be explained using FIG. 3. The sub microcomputer 12 performs a flowchart of FIG. 3 periodically, for example, each 100 ms. The processing operation of the sub microcomputer 12 is partially similar to the processing operation of the main microcomputer 11. Hereinafter, a difference between the processing operations of the sub microcomputer 12 and the main microcomputer 11 will be explained mainly. The initial value of the communication propriety of the sub microcomputer 12 is set to the non-permission, which is different from the main microcomputer 11.

Step S50, step S52, and step S54 respectively are substantially similar to step S10, step S12, and step 314, and thus the detailed explanation will be omitted. The sub microcomputer 12 performs step S50, step 352, and step 354.

The address is determined at step S56 (step S56 corresponding to a communication propriety determination portion). The sub microcomputer 12 determines whether the memory address included in the DL frame F1 corresponds to an address indicating a resource linked to the sub microcomputer 12, based on the memory address included in the DL frame F1 and the second linking information 12b. In other words, it is determined whether the DL frame F1 is a frame intended for the microcomputer (that is, the sub microcomputer 12 in this case). The sub microcomputer 12 determines that the DL frame F1 is a frame intended for the sub microcomputer 12 when it is determined that the memory address included in the DL frame F1 includes any one of 0x01000000 to 0x01FFFFFF, which is the second linking information 12b. The processing shifts to step S58. The sub microcomputer 12 determines that the DL frame F1 is not a frame to the sub microcomputer 12 when it is determined that the memory address included in the DL frame F1 is not 0x01000000 to 0x01FFFFFF, which is the second linking information 12b. In this case, the processing shifts to step S64. In other words, the sub microcomputer 12 once recognizes that the request frame is a frame for the microcomputer at step S52, and then, at step S56, the sub microcomputer 12 determines that the request frame is not a frame for the microcomputer.

At step S58, the communication propriety of the sub microcomputer 12 is set to the permission (step S58 corresponding to a communication propriety determination portion). The sub microcomputer 12 permits communication through the communication line 40, since the DL frame F1 is the request frame for the sub microcomputer 12. Accordingly, the sub microcomputer 12 can communicate with the diagnosis tool 200 in response to the DL frame F1.

At step S64, the communication propriety of the sub microcomputer 12 is set to the non-permission (step S64 corresponding to the communication propriety determination portion). The sub microcomputer 12 makes the communication through the communication line 40 be non-permission since the DL frame F1 is not the request frame for the sub microcomputer 12. Accordingly, the sub microcomputer 12 cannot communicate with the diagnosis tool 200, the second ECU 20, or the like.

Therefore, the sub microcomputer 12 determines whether the DL frame F1 is a download for the sub microcomputer 12 based on a memory address included in the DL frame F1 (step S56). When the memory address shows the DL frame F1 is the download for the sub microcomputer 12, the sub microcomputer 12 sets the communication propriety to the permission (step 358). In other cases, the sub microcomputer 12 does set the communication propriety to the non-permission.

Step S60, step S62, and step S66 respectively are substantially similar to step S20, step S22, and step S26, and thus the detailed explanation will be omitted. The sub microcomputer 12 performs step S60, step S62, and step S66.

At step 368, the communication propriety of the sub microcomputer 12 is determined. The sub microcomputer 12 determines the communication propriety based on stored content stored in the result store portion. The processing shifts to step 370 when the sub microcomputer 12 determines that the determination result stored in the result store portion indicates the permission. The processing of FIG. 3 ends when it is determined that the determination result indicates the non-permission.

Step S70, step 372, and step S74 respectively are substantially similar to step S30, step S32, and step S36, and thus the detailed explanation will be omitted. The sub microcomputer 12 performs step S70, step S72, and step S74.

At step S76, the communication propriety of the sub microcomputer 12 is determined. The sub microcomputer 12 determines the communication propriety based on stored content stored in the result store portion. The processing shifts to step S78 when the sub microcomputer 12 determines that the determination result stored in the result store portion indicates the permission. The processing shifts to step S82, when it is determined that the determination result indicates the non-permission.

Step S78 and step S80 respectively are substantially similar to step S38 and step S40, and thus the detailed explanation will be omitted. The sub microcomputer 12 performs step S78 and step S80.

At step S82, the communication propriety of the sub microcomputer 12 is set to the permission. The sub microcomputer 12 changes the communication propriety to the non-permission since the communication propriety has been set to the permission at the time of step S80. By contrast, as explained in step S42, the main microcomputer 11 sets the communication propriety to the permission when responding to the end frame F3 and communicating with the diagnosis tool 200 through the communication line 40. Accordingly, it is possible for the main microcomputer 11 to exclusively communicate through the communication line 40 when none of the main microcomputer 11 and the sub microcomputer 12 in the first ECU 10 continues the determination result. That is, the main microcomputer 11, which corresponds to the predetermined one microcomputer, performs a processing and responds to a request exclusively, in a case other than the download process continuing period.

At step S84, the communication propriety of the sub microcomputer 12 is determined. The sub microcomputer 12 determines the communication propriety based on the stored content stored in the result store portion. The processing shifts to step S86 when the sub microcomputer 12 determines that the determination result stored in the result store portion indicates the permission. The processing of FIG. 3 ends when it is determined that the determination result indicates the non-permission.

Step S86 and step S88 respectively are substantially similar to step S46 and step S48, and thus the detailed explanation will be omitted. The sub microcomputer 12 performs step S86 and step S88.

Thus, the main microcomputer 11 and the sub microcomputer 12 each determines that the corresponding microcomputer can communicate with the diagnosis tool 200 (that is, the communication is permissible) when a memory address included in the communication request indicates a resource linked with the corresponding microcomputer. The main microcomputer 11 and the sub microcomputer 12 each determines that the corresponding microcomputer cannot communicate with the diagnosis tool 200 (that is, the communication is impermissible) when the memory address does not indicate the resource linked with the corresponding microcomputer. The main microcomputer 11 and the sub microcomputer 12 each communicates with the diagnosis tool 200 in response to the communication request from the diagnosis tool 200 when it is determined that the communication is permitted. Therefore, it is possible for the first ECU 10 to prevent communication in the main microcomputer 11 and the sub microcomputer frames from colliding each other by concurrently performing communication.

Furthermore, the first ECU 10 includes the main microcomputer 11 and the sub microcomputer 12. Each of the main microcomputer 11 and the sub microcomputer 12 recognizes a common ID as a communication request intended for the respective microcomputer. That is, the main microcomputer 11 recognizes the common ID as the communication request for the main microcomputer 11, and also the sub microcomputer 12 recognizes the common ID as the communication request for the sub microcomputer 12. Thus, it is possible for the first ECU 10 to prevent the number of IDs from increasing even when the number of control portions, which correspond to the main microcomputer 11 and the sub microcomputer 12.

Thus, according to the present disclosure, it is possible to prevent frames from colliding as a result of concurrent communication by the main microcomputer 11 and the sub microcomputer 12, while preventing a depletion of IDs. Thus, it is possible for the first ECU 10 to prevent diagnosis identification information from depleting, even when diagnosis identification information, which is a limited number, is used.

Incidentally, the present embodiment uses the fault diagnosis tool 200 as an external device. It should be noted that the present disclosure is not limited to this embodiment. The second ECU 20 or the third ECU 30 can be considered as the external device. It is supposed that the present disclosure is applied to the second ECU 20. In this case, the external device may correspond to the fault diagnosis tool 200, the first ECU 10, and the third ECU 30. The external device may correspond to any device which can communicate with an electronic control apparatus to which the present disclosure is applied.

One embodiment of the present disclosure has been explained. It should be noticed that the present disclosure is not limited to the embodiment, and that the present disclosure can be modified variously within the scope of the present disclosure. Hereinafter, a second embodiment and a third embodiment will be explained as examples of another embodiment. It should be noticed that the above embodiment, the second embodiment and the third embodiment can be performed independently and can be performed after combining appropriately. It should be noticed that the present disclosure is not limited to a combination described in the embodiments and that the present disclosure can be performed based on various combinations.

Second Embodiment

For example, the common ID and the request frame in the present embodiment are different from the above described embodiment. The main microcomputer 11 and the sub microcomputer 12 respectively recognize a communication frame including 0x201 as a communication frame for the main microcomputer 11 and the sub microcomputer 12. In this case, 0x201 in the communication frame corresponds to the common ID. Also, in the present embodiment, instead of the multiple associating communication requests such as the DL frame F1, the transfer frame F2, the end frame F3, a microcomputer receives a single request frame as a communication frame, for example. Incidentally, the main microcomputer 11 and the sub microcomputer 12 respectively include the first linking information 11b and the second linking information 12b, similar to the above embodiment.

Figure 9:
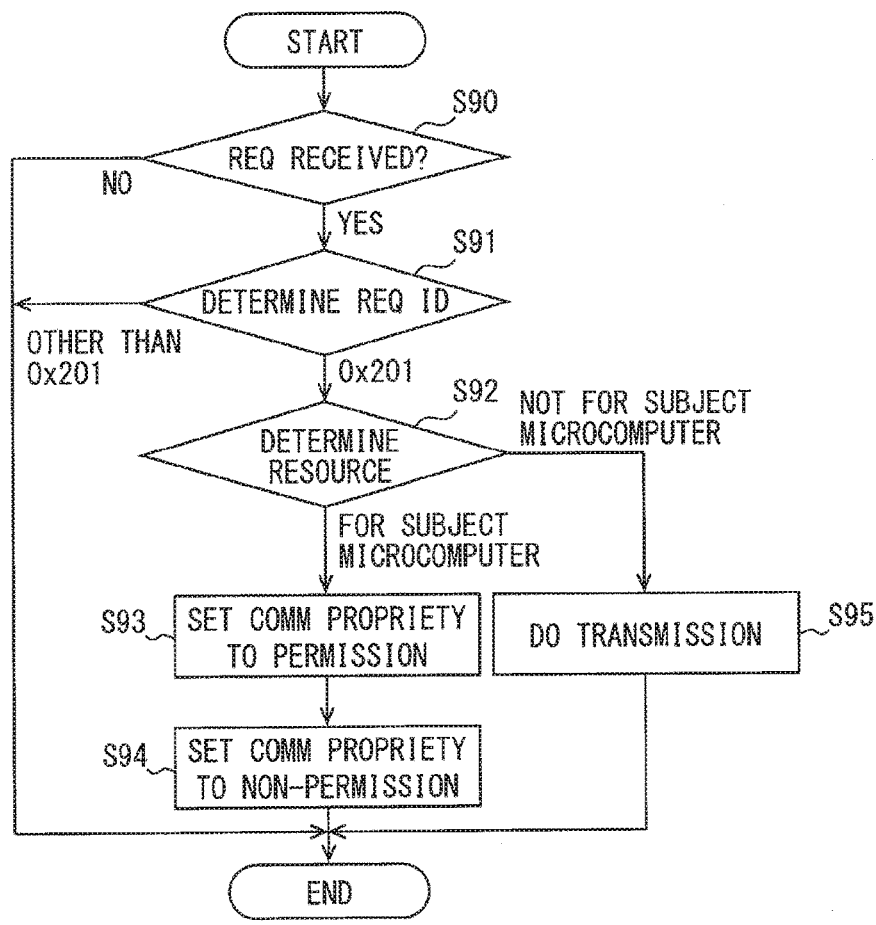
FIG. 9 is a flowchart illustrating a processing operation of a main microcomputer in a second embodiment.

The main microcomputer 11 in the present embodiment performs a flowchart of FIG. 9 periodically, for example, each 100 ms. Incidentally, the sub microcomputer 12 also executes a flowchart of FIG. 9.

At step S90, it is determined whether there is a request reception or not. That is, it is determined a request frame is received or not. The main microcomputer 11 determines whether the request frame is received or not. The processing shifts to step S91 when the main microcomputer 11 determines that the request frame is received. The processing of FIG. 9 ends when the main microcomputer 11 does not determined that the request frame is received.

At step S91, the request ID is determined. The main microcomputer 11 determines whether the ID included in the received request frame is intended for the microcomputer. In other words, the main microcomputer 11 checks the ID included in the request frame, and determine whether the request frame is intended for the microcomputer. The main microcomputer 11 considers the request frame is transmitted for the main microcomputer 11 and the processing shifts to step S92, when it is determined that the ID is 0x201. The main microcomputer 11 considers the request frame is not transmitted for the microcomputer and the processing of FIG. 9 ends, when it is determined that the ID is not 0x201.

The resource is determined at step S92 (step S92 corresponding to the communication propriety determination portion). The main microcomputer 11 determines whether a memory address included in the request frame is an address illustrating a resource linked to the microcomputer, based on a memory address included in the received request frame and the first linking information 11b. The main microcomputer 11 determines that the request frame is intended for the microcomputer (also referred to as a subject microcomputer) when the memory address included in the request frame is any one of 0x00000000 to 0x00FFFFFF, which is the first linking information 11b. The processing shifts to step S93. The main microcomputer 11 determines that the request frame is not intended for the microcomputer (also referred to as the subject microcomputer) when the memory address included in the request frame is not 0x00000000 to 0x00FFFFFF, which is the first linking information 11b. The processing shifts to step S95. In other words, the main microcomputer 11 once recognizes that the request frame is intended for the microcomputer at step S91, and then, determines at step S92 that the request frame is not intended for the microcomputer.

At step S93, the communication propriety of the main microcomputer 11 is set to the permission (step S93 corresponding to the communication propriety determination portion). The main microcomputer 11 permits communication through the communication line 40, since the received request frame is a request frame for the microcomputer. Accordingly, the main microcomputer 11 can communicate with the diagnosis tool 200 in response to the request frame.

At step S94, a transmission processing is performed (step S94 corresponding to a communication portion). The main microcomputer 11 responds to the received request frame, and communicates with the diagnosis tool 200 through the communication line 40. In this case, the main microcomputer 11 transmits the response frame to the diagnosis tool 200. Incidentally, the main microcomputer 11 may perform a processing in accordance with a request by a request frame before transmitting the response frame.

At step S95, the communication propriety of the main microcomputer 11 is set to the non-permission (step S95 corresponding to a communication propriety determination portion). The main microcomputer 11 sets the communication through the communication line 40 to the non-permission since the received request frame is not a request frame intended for the microcomputer. Accordingly, the main microcomputer 11 cannot communicate with the diagnosis tool 200, the second ECU 20, or the like.

The first ECU 10 of the present embodiment has similar effects according to the above embodiment. Furthermore, according to the present embodiment, it is possible for the main microcomputer 13 and the sub microcomputer 14 to obtain the similar effects of the above embodiment, not only in a case where multiple associating communication requests are received.

Third Embodiment

Figure 10:
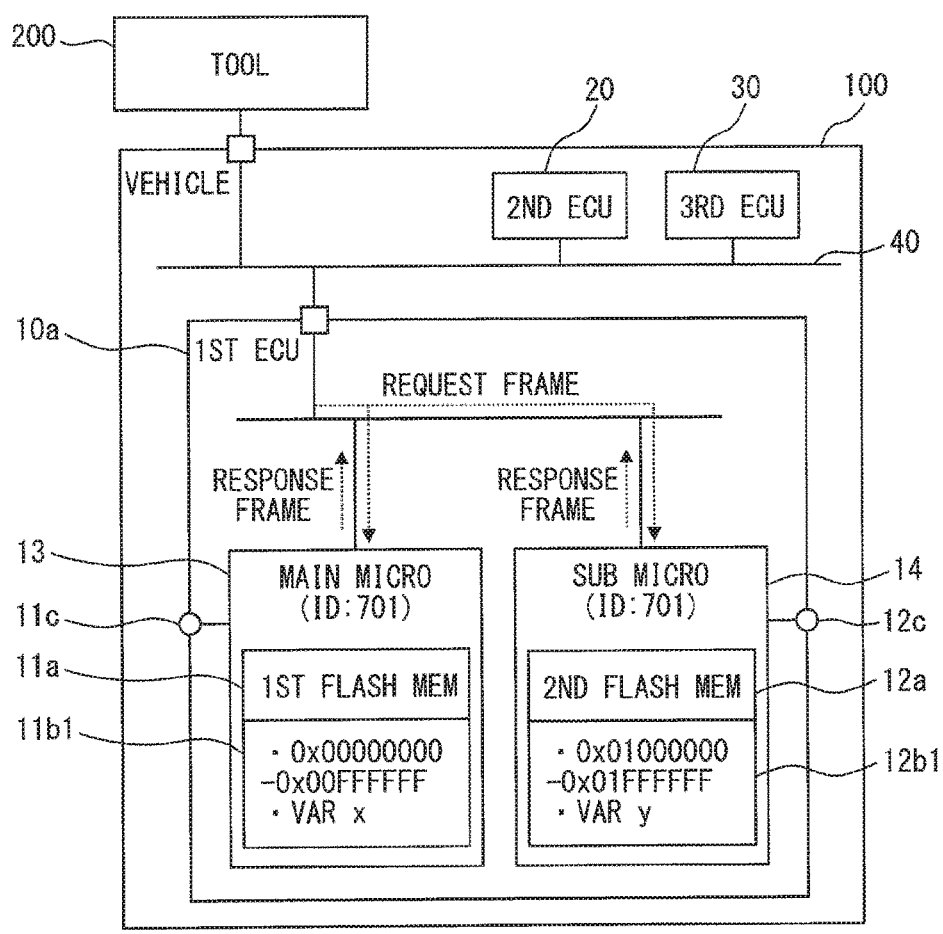
FIG. 10 is a block diagram illustrating a schematic configuration of a first ECU in a third embodiment.

For example, the linking information in the present embodiment is different from the described embodiments. As illustrated in FIG. 10, the ECU 10a of the present embodiment includes a main microcomputer 13 and the sub microcomputer 14. Furthermore, the first ECU 10a includes a first port 11c and a second port 12c as resources. The first port 11c corresponds to a port receiving a signal indicating a particular variable x. The second port 12c corresponds to a port receiving a signal indicating a variable y, which is different from the variable x. Incidentally, the variable x and the variable y correspond to, for example, a detection value that has been detected by a sensor or the like connected to the first ECU 10.

The main microcomputer 13 enables to obtain the signal indicating the variable x by accessing the first port 11c, but does not access the second port 12c. By contrast, the sub microcomputer 14 enables to obtain the signal indicating the variable y by accessing the second port 12c, but does not access the first port 11c.

That is, the first port 11c is considered to be a resource individually corresponding to the main microcomputer 13. The first port 11c is considered to be provided dedicated to the main microcomputer 13, or to exist under the main microcomputer 13. Thus, information indicating the first port 11c (for example, a data identifier that is a value individually assigned to a variable) and the variable x are considered to be specific information for the main microcomputer 13. Information indicating the first port 11c and the variable x are considered to be resource information.

Thus, the first linking information 11b1 in the present embodiment includes information in which the first port 11c corresponding to the main microcomputer 13 is linked with the main microcomputer 13 without individually overlapping. Thus, the information indicating the first port 11c and the variable x may be used as the first linking information 11b1 In other words, in the first linking information 11b1, the information indicating the first port 11c or the variable x each corresponding to the main microcomputer 13 is linked with the main microcomputer 13 without individually overlapping. The first linking information 11b1 does not overlap with the second linking information 12b1 of the sub microcomputer 12. The first linking information 11b1 is considered to be information that links (or associates or coordinates) the main microcomputer 13 and the first port 11c.

Therefore, when a communication frame received from the diagnosis tool 200 or the like includes the information indicating the first port 11c or the variable x, the main microcomputer 13 can recognize that the communication frame is a communication frame transmitted for the microcomputer.

The second port 12c is considered to be a resource individually corresponding to the sub microcomputer 14. The second port 12c is considered to be provided dedicated to the sub microcomputer 14, or to exist under the sub microcomputer 14. Thus, the information indicating the second port 12c (for example, a data identifier that is a value individually assigned to a variable) and the variable y may be specific information for the sub microcomputer 14. Information indicating the second port 12c and the variable y is considered to be resource information.

Thus, the second linking information 12b1 in the present embodiment includes information in which the second port 12c corresponding to the sub microcomputer 14 is linked with the sub microcomputer 14 without individually overlapping. Thus, the information indicating the second port 12c and the variable y may be used as the second linking information 12b1 In other words, in the second linking information 12b1, the information indicating the second port 12c or the variable y each corresponding to the sub microcomputer 14 is linked with the sub microcomputer 14 without individually overlapping. The second linking information 12b1 does not overlap with the first linking information 11b1 of the main microcomputer 13. The second linking information 12b1 is considered to be information that links (or associates or coordinates) the sub microcomputer 14 and the second port 12c.

Therefore, when a communication frame received from the diagnosis tool 200 or the like includes the information indicating the second port 12c or the variable y, the sub microcomputer 14 can recognize that the communication frame is a communication frame transmitted for the microcomputer.

Incidentally, the first linking information 11b1 and the second linking information 12b1 may not include an address. FIG. 10 omits information indicating the first port 11c in the first linking information 11b1 and information indicating the second port 12c in the second linking information 12b1.

According to the first ECU 10a, the effects similar to the first ECU 10 can be obtained. The main microcomputer 13 and the sub microcomputer 14 can recognize a certain communication frame is a communication frame transmitted to the corresponding microcomputer when the certain communication frame includes the variable x or the variable y, even when the request frame does not include a memory address.

It is noted that a flowchart or the process of the flowchart in the present application includes steps (also referred to as sections), each of which is represented, for instance, as S10. Further, each step can be divided into several sub-steps while several steps can be combined into a single step.

While the embodiments, the configurations, the aspects of an electronic control apparatus have been described by way of example, it should be appreciated that embodiments, configurations, aspects of the present disclosure are not limited to the respective embodiments, the respective configurations, and the respective aspects described above. For example, embodiments, configurations, aspects obtained by appropriately combining technical portions disclosed in different embodiments, configurations, and aspects are included within a range of embodiments, configurations, and aspects of the present disclosure.

What is claimed is:
1. An electronic control apparatus that is communicable with at least one external device through a communication line and at least receives a communication request from the at least one external device, the communication request including identification information indicating a reception destination and resource information indicating a resource, the electronic control apparatus comprising:
- a plurality of control portions;
- a plurality of resources that individually correspond to each of the control portions, each of the control portions recognizing the communication request including common identification information as the communication request to a corresponding control portion of the control portions;
- linking information that links the resources individually corresponding to each of the control portions with respect to the control portions without individually overlapping;
- a communication propriety determination portion that determines a communication propriety with the at least one external device corresponding to the communication request, based on the resource information included in the communication request and the linking information in receiving the communication request; and
- a communication portion that responds to the communication request and communicates with the at least one external device when the communication propriety determination portion determines that communication is permitted, wherein:
the communication propriety determination portion determines that the communication with the at least one external device is permitted when the resource information included in the communication request indicates the resource linked with the corresponding control portion; and
the communication propriety determination portion determines that the communication with the at least one external device is not permitted when the resource information included in the communication request does not indicate the resource linked with the corresponding control portion.

2. The electronic control apparatus according to claim 1, wherein:
the communication line connects the plurality of control portions and a plurality of external devices; and
the identification information indicates a priority order in communication through the communication line.

3. The electronic control apparatus according to claim 2, wherein:
one function is realized by communicating with at least one of the external devices in response to each of a plurality of communication requests, the communication requests being associated with each other; and
the communication propriety determination portion continues a determination result based on an initial communication request of the communication requests until the communication with the at least one of the external devices in response to all of the communication requests terminates.

4. The electronic control apparatus according to claim 3, wherein
only a particular control portion of the plurality of control portions, the particular control portion including the communication propriety determination portion which continues the determination result, deals with a request from the at least one of the external devices.

5. The electronic control apparatus according to claim 3, wherein:
the plurality of communication requests being associated with each other include (i) a download request requesting download of data as the initial communication request, (ii) a data transfer request requesting transfer of the data, and (iii) a transfer end request requesting an end of transfer of the data as a last communication request; and
the communication propriety determination portion continues the determination result based on the initial communication request until a communication with the at least one of the external devices in response to the transfer end request terminates.

6. The electronic control apparatus according to claim 5, wherein:
the control portions capture the data as a process of the data transfer request requesting transfer of the data.

7. The electronic control apparatus according to claim 3, wherein:
only a predetermined control portion of the control portions deals with a request from at least one of the external devices when all communication propriety determination portions do not continue the determination result.

8. The electronic control apparatus according to claim 1, wherein:
a plurality of storage areas are provided as the resources;
the resource information includes an address indicating each of the storage areas; and
the linking information links the address indicating each of the storage areas corresponding to each of the control portions with respect to each of the control portions without individually overlapping.

9. The electronic control apparatus according to claim 1, wherein:
the identification information is provided by diagnosis identification information that is assigned to perform a fault diagnosis.

* * * * *